United States Patent
Han et al.

(10) Patent No.: US 10,915,768 B2
(45) Date of Patent: *Feb. 9, 2021

(54) VEHICLE AND METHOD OF CONTROLLING THE SAME

(71) Applicants: Hyundai Motor Company, Seoul (KR); Kia Motors Corporation, Seoul (KR)

(72) Inventors: Jimin Han, Seoul (KR); Seok-young Youn, Seoul (KR); Jia Lee, Seoul (KR); Kye Yoon Kim, Gunpo-si (KR); Seunghyun Woo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,326

(22) Filed: Sep. 5, 2019

(65) Prior Publication Data

US 2020/0151471 A1     May 14, 2020

(30) Foreign Application Priority Data

Nov. 13, 2018   (KR) .................. 10-2018-0138608

(51) Int. Cl.
| | |
|---|---|
| *G06K 9/00* | (2006.01) |
| *G06F 3/01* | (2006.01) |
| *G10L 25/63* | (2013.01) |
| *G06F 3/16* | (2006.01) |
| *G09G 5/373* | (2006.01) |

(52) U.S. Cl.
CPC ......... *G06K 9/00832* (2013.01); *G06F 3/015* (2013.01); *G06F 3/165* (2013.01); *G09G 5/373* (2013.01); *G10L 25/63* (2013.01); *G09G 2340/045* (2013.01); *G09G 2354/00* (2013.01); *G09G 2380/12* (2013.01)

(58) Field of Classification Search
None
See application file for complete search history.

(56) References Cited

U.S. PATENT DOCUMENTS

| | | | | |
|---|---|---|---|---|
| 2016/0316237 | A1* | 10/2016 | Couleaud | H04N 21/25883 |
| 2018/0131992 | A1* | 5/2018 | Couleaud | H04N 21/41422 |
| 2018/0173796 | A1* | 6/2018 | Murata | G06K 9/00845 |

FOREIGN PATENT DOCUMENTS

KR   10-2014-0112008 A   9/2014

* cited by examiner

*Primary Examiner* — Duane N Taylor, Jr.
(74) *Attorney, Agent, or Firm* — Morgan, Lewis & Bockius LLP

(57) ABSTRACT

A vehicle includes: a user interface including a display and a speaker; a capturer configured to capture a passenger's image; and a controller configured to obtain emotion information representing the passenger's emotion based on the image, to determine content corresponding to the emotion information, to control the user interface to output the determined content, to obtain circumstance information representing the passenger's circumstances based on the image after the determined content is output, to modify the determined content based on the circumstance information, and to control the user interface to output the modified content.

26 Claims, 12 Drawing Sheets

300

| AGE | PHYSICAL INFORMATION |
|---|---|
| ONE MONTH OF AGE | AVERAGE HEIGHT: 55cm/ AVERAGE HEART RATE: 162BEATS |
| SIX MONTH OF AGE | AVERAGE HEIGHT: 71cm/ AVERAGE HEART RATE: 147BEATS |
| TWELVE MONTH OF AGE | AVERAGE HEIGHT: 75cm/ AVERAGE HEART RATE: 130BEATS |
| TWENTY-FOUR MONTH OF AGE | AVERAGE HEIGHT: 78cm/ AVERAGE HEART RATE: 130BEATS |

| AGE | PHYSICAL INFORMATION |
|---|---|
| ONE MONTH OF AGE | AVERAGE HEIGHT: 55cm/ AVERAGE HEART RATE: 162BEATS |
| SIX MONTH OF AGE | AVERAGE HEIGHT: 71cm/ AVERAGE HEART RATE: 147BEATS |
| TWELVE MONTH OF AGE | AVERAGE HEIGHT: 75cm/ AVERAGE HEART RATE: 130BEATS |
| TWENTY-FOUR MONTH OF AGE | AVERAGE HEIGHT: 78cm/ AVERAGE HEART RATE: 130BEATS |

| BIO-SIGNALS \ EMOTION FACTOR | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| GSR | .875 | .775 | .653 | .353 | .545 | | | | .655 | .545 | | | | | .353 |
| EEG | .555 | 0.864 | .878 | | .545 | | .464 | .477 | .577 | | | | .353 | | |

| EXPRESSION / EMOTION | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| EXPRESSION 1 | .65 | .87 | .35 | .88 | .14 | | | | .63 | .53 | | | | | .33 |
| EXPRESSION 2 | .01 | 0.09 | .11 | | .54 | | .31 | .51 | .61 | | | | | | .97 |
| EXPRESSION 3 | .70 | | .90 | | .19 | .87 | | | | | | | | | |

FIG. 7

| AGE | CONTENT | ASSOCIATION |
|---|---|---|
| ONE MONTH OF AGE | CONTENT A | EMOTION a: 0.84 / EMOTION b: 0.53 / EMOTION c: 0.43 |
| | CONTENT B | EMOTION a: 0.34 / EMOTION b: 0.67 / EMOTION c: 0.87 |
| | CONTENT C | EMOTION a: 0.43 / EMOTION b: 0.87 / EMOTION c: 0.24 |
| SIX MONTH OF AGE | CONTENT D | EMOTION a: 0.86 / EMOTION b: 0.43 / EMOTION c: 0.25 |
| | CONTENT E | EMOTION a: 0.32 / EMOTION b: 0.89 / EMOTION c: 0.75 |
| | CONTENT F | EMOTION a: 0.21 / EMOTION b: 0.45 / EMOTION c: 0.98 |
| TWENTY-FOUR MONTH OF AGE | CONTENT G | EMOTION a: 0.82 / EMOTION b: 0.51 / EMOTION c: 0.41 |
| | CONTENT H | EMOTION a: 0.31 / EMOTION b: 0.63 / EMOTION c: 0.89 |
| | CONTENT I | EMOTION a: 0.44 / EMOTION b: 0.89 / EMOTION c: 0.21 |

FIG. 9

| CIRCUMSTANCE | PASSENGER'S IMAGE AND FEATURES OF BIO-SIGNALS |
|---|---|
| DEGREE OF NEGATIVITY OF EMOTION IS ABOVE THRESHOLD LEVEL | ANGRY EXPRESSION, CRYING, HIGH HEART RATE, ETC. |
| CRYING UTTERANCE | GRIMACE, TEARS, CRYING, HIGH HEART RATE, ETC. |
| PROTECTION REQUEST WORD UTTERANCE | UNEASY EXPRESSION, PROTECTION REQUEST VOICE, HIGH HEART RATE, ETC. |
| DROWSY STATE | CLOSED EYES, NO MOVEMENT, AVERAGE HEART RATE, ETC. |
| URINE AND FECES DISCHARGE STATE | GRIMACE, CRYING, HIGH HEART RATE, ETC. |

VEHICLE AND METHOD OF CONTROLLING THE SAME

CROSS-REFERENCE TO RELATED APPLICATION(S)

This application is based on and claims the benefit of priority under 35 U.S.C. § 119 to Korean Patent Application No. 10-2018-0138608, filed on Nov. 13, 2018 in the Korean Intellectual Property Office, the entire disclosure of which is incorporated by reference in.

TECHNICAL FIELD

Exemplary embodiments of the present disclosure relate to a vehicle capable of providing content that can induce a passenger's interest based on the passenger's emotion and circumstances, and a method of controlling the vehicle.

BACKGROUND

Generally, infant-related contents are provided to infants as one-sided content playback. Accordingly, an infant watching an infant-related content may be placed in a situation of watching the content provided regardless of his or her will, and may not concentrate on the content to be provided.

The infant watching the infant-related content may have difficulty in changing or modifying the content according to his or her will, and may therefore ask a driver of a vehicle who is a guardian for assistance. However, the driver may not be able to provide assistance to the infant while driving a vehicle, and in a situation where assistance is provided to the infant, the probability of a vehicular accident may increase.

SUMMARY

According to an aspect of the present disclosure, a vehicle for determining a passenger's emotion and circumstances and providing content to induce the passenger's interest based on the determined emotion and circumstances, and a method of controlling the vehicle, are described herein.

Additional aspects of the disclosure will be set forth in part in the description which follows and, in part, will be obvious from the description, or may be learned by practice of the disclosure.

In accordance with an aspect of the present disclosure, a vehicle includes: a user interface including a display and a speaker; a capturer configured to capture an image of the passenger; and a controller configured to obtain emotion information representing an emotion of the passenger based on the image, to determine content corresponding to the emotion information, to control the user interface to output the determined content, to obtain circumstance information representing circumstances of the passenger based on the image after the determined content is output, to modify the determined content based on the circumstance information, and to control the user interface to output the modified content.

The vehicle may further include: a sensing device configured to measure bio-signals of the passenger. The controller may obtain the emotion information based on the image or the bio-signals, and obtain the circumstance information based on the image or the bio-signals after the determined content is output.

The controller may obtain the circumstance information based on the captured image or the measured bio-signals for a predetermined time after the determined content is output, and modify the determined content when a circumstance represented by the circumstance information corresponds to a predetermined circumstance.

The predetermined circumstance may include at least one of a circumstance in which a degree of negativity of the emotion of the passenger represented by the emotion information is equal to or greater than a threshold level, a circumstance in which the passenger utters crying, a circumstance in which the passenger utters a protection request word, or a circumstance in which the passenger is sleepy.

The controller may modify at least one of a playback speed, playback music, a playback interval, an output size, a movement of a character, a shape of the character, a color of the character, a face of the character, or a voice of the character of the determined content.

The controller may determine the playback interval in which a degree of positivity of the emotion of the passenger is less than a threshold level among at least one playback interval of the determined content based on the emotion information, and modify the determined content to increase the playback speed of the playback interval.

The controller may determine the playback interval in which a degree of positivity of the emotion of the passenger is less than a threshold level among at least one playback interval of the determined content based on the emotion information.

The controller may modify the determined content to play so that the playback music or the playback image in the playback interval is repeatedly played.

The controller may modify the determined content to increase the output size of the playback music in the playback interval, or modify the determined content to increase an image size of the playback image in the playback interval.

The controller may modify the determined content so that the movement of the character, the shape of the character, or the color of the character in the playback interval is reflected in the character of a current playback interval.

The controller may modify the determined content so that the face of the character is modified into a face of the passenger or a face of a guardian, or the voice of the character is modified into a voice of the passenger or a voice of the guardian.

The controller may compare at least one of the image or the bio-signals with physical information by age to determine an age of the passenger.

The controller may determine an age corresponding content group that includes at least one content corresponding to the age, and determine the content having the highest association with the emotion represented by the emotion information among the at least one content included in the age corresponding content group as the content corresponding to the emotion information.

The controller may obtain the emotion information for a predetermined time after the determined content is output based on the image captured or the bio-signals measured for the predetermined time after the determined content is output, compare the emotion information for the predetermined time after the determined content is output and the emotion information prior to the output of the determined content, and update the association between the emotion represented by the emotion information and the determined content.

The controller may increase, when a degree of positivity of the emotion information for the predetermined time after the output of the determined content is greater than the degree of positivity of the emotion information prior to the output of the determined content, the association between the determined content and the emotion represented by the emotion information.

The controller may decrease, when a degree of positivity of the emotion information for the predetermined time after the output of the determined content is lower than the degree of positivity of the emotion information prior to the output of the determined content, the association between the determined content and the emotion represented by the emotion information.

The controller may determine, when the association of the emotion represented by the emotion information of the determined content is lower than the association of the emotion represented by the emotion information of the other contents including the age corresponding content group, the other contents as the content corresponding to the emotion information.

In accordance with another aspect of the disclosure, a method of controlling a vehicle that includes a user interface including a display and a speaker, the method including: capturing, by a capturer, an image of the passenger; obtaining, by a controller, emotion information representing an emotion of the passenger based on the image; determining, by the controller, content corresponding to the emotion information; controlling, by the controller, the user interface to output the determined content; obtaining, by the controller, circumstance information representing circumstances of the passenger based on the image after the determined content is output; modifying, by the controller, the determined content based on the circumstance information; and controlling, by the controller, the user interface to output the modified content.

The method may further include: measuring, by a sensing device, bio-signals of the passenger; obtaining, by the controller, the emotion information based on the image or the bio-signals; and obtaining, by the controller, the circumstance information based on the image or the bio-signals after the determined content is output.

The modifying of the determined content may include obtaining the circumstance information based on the captured image or the measured bio-signals for a predetermined time after the determined content is output; and modifying the determined content when a circumstance represented by the circumstance information corresponds to a predetermined circumstance.

The predetermined circumstance may include at least one of a circumstance in which a degree of negativity of the emotion of the passenger represented by the emotion information is equal to or greater than a threshold level, a circumstance in which the passenger utters crying, a circumstance in which the passenger utters a protection request word, or a circumstance in which the passenger is sleepy.

The modifying of the determined content may include modifying at least one of a playback speed, playback music, a playback interval, an output size, a movement of a character, a shape of the character, a color of the character, a face of the character, or a voice of the character of the determined content.

The modifying of the determined content may include determining the playback interval in which a degree of positivity of the emotion of the passenger is less than a threshold level among at least one playback interval of the determined content based on the emotion information; and modifying the determined content to increase the playback speed of the playback interval.

The modifying of the determined content may include determining the playback interval in which a degree of positivity of the emotion of the passenger is less than a threshold level among at least one playback interval of the determined content based on the emotion information.

The modifying of the determined content may include modifying the determined content to play so that the playback music or the playback image in the playback interval is repeatedly played.

The modifying of the determined content may include modifying the determined content to increase the output size of the playback music in the playback interval; or modifying the determined content to increase an image size of the playback image in the playback interval.

The modifying of the determined content may include modifying the determined content so that the movement of the character, the shape of the character, or the color of the character in the playback interval is reflected in the character of a current playback interval.

The modifying of the determined content may include modifying the determined content so that the face of the character is modified into a face of the passenger or a face of a guardian, or the voice of the character is modified into a voice of the passenger or a voice of the guardian.

The method may further include: comparing, by the controller, at least one of the image or the bio-signals with physical information by age to determine an age of the passenger.

The determining of the content corresponding to the emotion information may include determining an age corresponding content group that includes at least one content corresponding to the age; and determining the content having the highest association with the emotion represented by the emotion information among the at least one content included in the age corresponding content group as the content corresponding to the emotion information.

The method may further include: obtaining, by the controller, the emotion information for a predetermined time after the determined content is output based on the image captured or the bio-signals measured for the predetermined time after the determined content is output; comparing, by the controller, the emotion information for the predetermined time after the determined content is output and the emotion information prior to the output of the determined content; and updating, by the controller, the association between the emotion represented by the emotion information and the determined content.

The updating of the association may include increasing, when a degree of positivity of the emotion information for the predetermined time after the output of the determined content is greater than the degree of positivity of the emotion information prior to the output of the determined content, the association between the determined content and the emotion represented by the emotion information.

The updating of the association may include decreasing, when a degree of positivity of the emotion information for the predetermined time after the output of the determined content is lower than the degree of positivity of the emotion information prior to the output of the determined content, the association between the determined content and the emotion represented by the emotion information.

The method may further include: determining, by the controller, when the association of the emotion represented by the emotion information of the determined content is lower than the association of the emotion represented by the emotion information of the other contents including the age corresponding content group, the other contents as the content corresponding to the emotion information.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a view illustrating physical information by age according to an exemplary embodiment of the present disclosure;

FIG. 7 is a view illustrating content reference information according to an exemplary embodiment of the present disclosure;

FIG. 9 is a view illustrating circumstance reference information according to an exemplary embodiment of the present disclosure;

DETAILED DESCRIPTION

Figure 1:
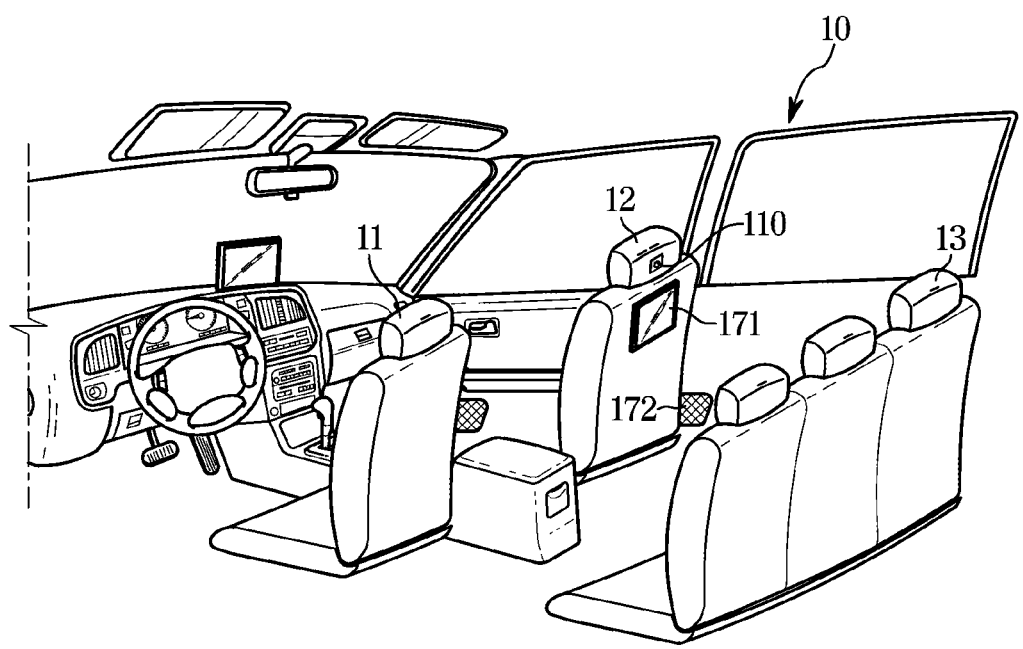
FIG. 1 is a view illustrating an interior of a vehicle according to an exemplary embodiment of the present disclosure.

Like numbers refer to like elements throughout this specification. This specification does not describe all components of the embodiments, and general information in the technical field to which the disclosure belongs or overlapping information between the embodiments will not be described.

It will be understood that when a component is referred to as being "connected" to another component, it can be directly or indirectly connected to the other component. When a component is indirectly connected to another component, it may be connected to the other component through a wireless communication network.

Further, it will be understood that the terms "includes," "comprises," "including," and/or "comprising," when used in this specification, specify the presence of a stated component, but do not preclude the presence or addition of one or more other components.

Still further, it is to be understood that the singular forms "a," "an," and "the" include plural referents unless the context clearly dictates otherwise.

As used herein, the terms "portion," "unit," "block," "member," or "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Reference numerals used in operations are provided for convenience of description, without describing the order of the operations, and the operations can be executed in a different order from the stated order unless a specific order is definitely specified in the context.

Hereinafter, embodiments of a vehicle according to an aspect and a method of controlling the vehicle will be described in detail with reference to the accompanying drawings.

Figure 2:
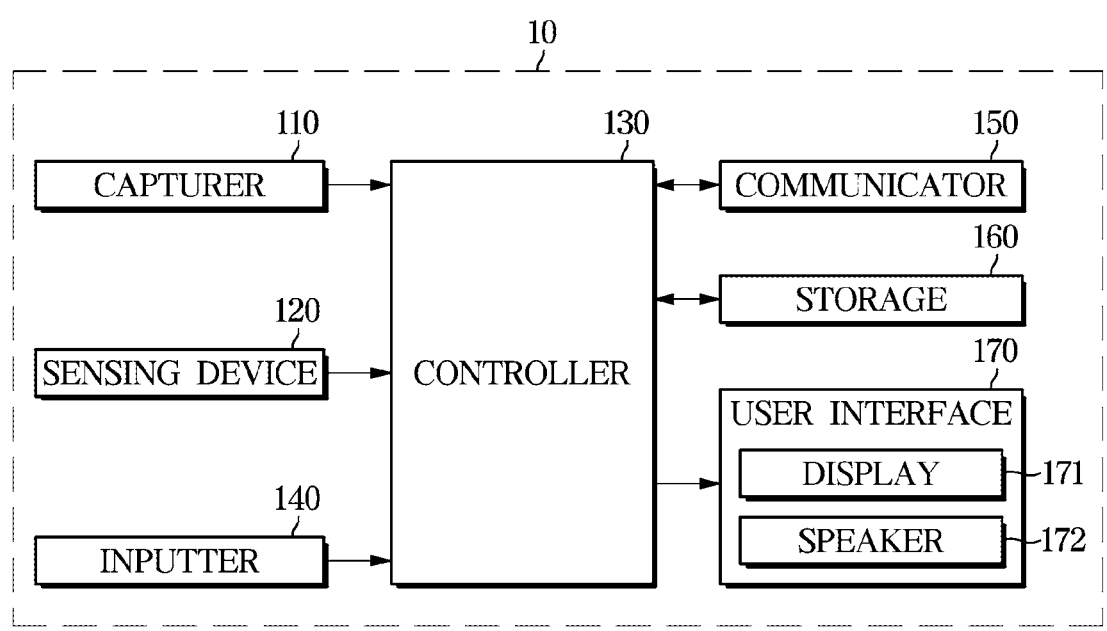
FIG. 2 is a control block diagram of a vehicle according to an exemplary embodiment of the present disclosure.

FIG. 1 is a view illustrating an interior of a vehicle according to an exemplary embodiment of the present disclosure, and FIG. 2 is a control block diagram of a vehicle according to an exemplary embodiment of the present disclosure.

Referring to FIG. 1, a driver's seat 11 on which a driver of the vehicle 10 can sit and a passenger seat 12 on which a passenger of the vehicle 10 can sit may be provided inside a vehicle 10 according to an exemplary embodiment of the present disclosure.

In addition, a rear seat 13 on which another passenger can sit may be provided inside the vehicle 10.

A display 171 and a speaker 172 providing content to the passenger seated on the rear seat 13 may be provided inside the vehicle 10. Thus, the passenger seated on the rear seat 13 may watch the content output from the display 171 and the speaker 172.

A capturer 110 capturing an image of the passenger seated on the rear seat 13 may be provided inside the vehicle 10. The vehicle 10 may obtain an age, emotion information, and circumstance information of the passenger seated on the rear seat 13 based on the image captured by the capturer 110. This will be described in detail later.

The passenger seated on the rear seat 13 may correspond to an infant having a relationship with the driver seated on the driver's seat 11 or the passenger seated on the passenger seat 12. Hereinafter, the infant seated on the rear seat 13 will be referred to as the passenger, and a method of providing the content that the passenger can satisfy and concentrate on based on the passenger's emotion and circumstances will be described.

However, the following description does not exclude a case where the infant sits on the passenger seat 12 other than when the infant sits on the rear seat 13. The capturer 110, the display 171, and the speaker 172 may be provided at the front end of the passenger seat 12 in the case where the infant seats on the passenger seat 12.

Referring to FIG. 2, the vehicle 10 may include the capturer 110 for capturing the image of the passenger, a sensing device 120 for measuring the passengers bio-signals, a controller 130 for determining the passenger's age based on the passengers image and the passenger's bio-signals, obtaining the emotion information representing the passenger's emotion and circumstance information representing the passenger's circumstances based on the passenger's image or the passenger's bio-signals, determining the content corresponding to the emotion information, and modifying the content determined based on the circumstance information, an inputter 140 for receiving an input from the passenger of the vehicle 10 including the driver and the passenger, a communicator 150 for communicating with an external server, a storage 160 for storing information about the operation of the vehicle 10, and a user interface 170 for outputting the determined content or modified content and including the display 171 and the speaker 172.

The controller 130 of the apparatus according to an exemplary embodiment of the present disclosure may be a processor (e.g., computer, microprocessor, CPU, ASIC, circuitry, logic circuits etc.). The controller 130 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The capturer 110 is installed in the front end of the rear seat 13, and may capture the passenger's image. For example, the capturer 110 may be installed on the rear side of the passenger seat 12, as illustrated in FIG. 1. However, the disclosure is not limited to this, and the capturer 110 may be installed in any position as long as it can capture the passenger's image boarding the rear seat 13, and the number of the capturers 110 is not limited.

Further, the capturer 110 may be provided with, e.g., a camera, etc. to obtain the passenger's image and generate image data. Accordingly, the capturer 110 may capture the passenger's facial expression, and may transmit the image data related to the captured facial expression to the controller 130.

The sensing device 120 may measure the passenger's bio-signals. The passenger's bio-signals may be transmitted to the controller 130 and stored in the storage 160. The sensing device 120 may be installed at various positions in the vehicle 10. For example, the sensing device 120 may be provided on, for example, the seats 11, 12, and 13, a seat belt (not shown), etc.

The sensing device 120 may include at least one of a galvanic skin response (GSR) sensor for measuring skin electrical conductivity of the passenger, a skin temperature sensor for measuring a skin temperature of the passenger, a heart rate (HR) sensor for measuring a heart rate of the passenger, an electroencephalogram (EEG) sensor for measuring brainwaves of the passenger, a voice recognition sensor for measuring a voice signal of the passenger, and an eye tracker for tracking the positions of pupils. However, sensors that may be included in the sensing device 120 are not limited to the above-mentioned sensors, and the sensing device 120 may include other sensors measuring a person's bio-signals.

The controller 130 may obtain the emotion information representing the passenger's emotion based on at least one of the passengers image and the passenger's bio-signals. A detailed description for obtaining passengers emotional information will be described later.

The controller 130 may determine the content corresponding to the obtained emotion information.

Particularly, the controller 130 may determine the content corresponding to the obtained emotion information based on content reference information stored in the storage 160.

The content reference information may include an association by emotion of each of the contents. That is, the content reference information may include the association corresponding to a criterion of to what extent each of the contents can cause a positive emotional change for each of a plurality of emotions.

For example, the content reference information is the association that corresponds the criterion of whether the passenger's emotion can cause the positive emotional change when the content is played in a situation where the emotion is a, and may include information representing that content A is 0.84, content B is 0.34, and content C is 0.43.

That is, the content reference information may include a value between 0 and 1 of the association that corresponds to the criterion of whether the positive emotion change can be caused in the corresponding emotion.

The controller 130 may determine the content corresponding to the emotion information having the highest association with the emotion based on the infant passengers emotion represented by the obtained emotion information.

That is, the controller 130 may determine the content corresponding to the emotion information, which is determined to cause the most positive emotional change in a current emotion, based on the current emotion of the passenger, and control the user interface 170 to output the determined content.

Accordingly, although the infant passenger cannot select the content with his or her own intention, the infant passenger may receive the content that can cause the most positive emotional change under the control of the controller 130.

The controller 130 may consider the age of the infant passenger when determining the content corresponding to the emotion information.

Particularly, the controller 130 may determine the age of the passenger based on the passengers image or the passenger's bio-signals.

At this time, the controller 130 may use physical information by age stored in the storage 160.

The physical information by age may include average physical information according to the infancy age in months. For example, the physical information by age may include physical information such as average height information, average heart rate, and average pulse rate per month.

Accordingly, the controller 130 may determine the age of the infant passenger by comparing at least one of the passengers image and the passenger's bio-signals with the physical information by age.

The controller 130 may determine an age corresponding content group that includes at least one content corresponding to the age, and may determine the content having the highest association with the emotion represented by the emotion information among the at least one content included in the determined age corresponding content group as the content corresponding to the emotion information.

At this time, the content reference information may include information about the age corresponding content group that classifies content by age group.

The controller 130 may obtain the circumstance information representing the passenger's circumstances based on the passengers image or the passenger's bio-signals after the content corresponding to the emotion information is determined.

Particularly, the controller 130 may obtain the circumstance information based on the image captured for a predetermined time after the determined content is output or the bio-signals measured for the predetermined time after the determined content is output.

The circumstance information corresponds to the information representing the passenger's circumstances and the information representing the passenger's present situation.

For example, when the current circumstances of the passenger is in a state of discharging urine and feces, the circumstance information representing the urine and feces discharge state may be obtained.

At this time, the controller 130 may use the circumstance reference information stored in the storage 160.

The circumstance reference information may include information about features represented by the passenger's image and the bio-signals by circumstance. That is, the circumstance reference information may include information about what features are occurring in the passenger's image and the bio-signals for a specific circumstance.

For this, the controller 130 may analyze the passengers image and the bio-signals based on the circumstance reference information, and obtain the circumstance information corresponding to the feature included in the circumstance reference information.

The controller 130 may modify the content determined based on the circumstance information.

Particularly, when the obtained circumstance information corresponds to predetermined circumstance information, the controller 130 may modify the determined content.

The predetermined circumstance information may correspond to a situation where the passenger's interest in the content is low and may be set when the vehicle 10 is designed, or may be set through the inputter 140 by the driver or the passenger corresponding to the guardian.

For example, the predetermined circumstance information may include at least one of a circumstance in which a degree of negativity of the passengers emotion represented by the emotion information is equal to or greater than a threshold level, a circumstance in which the passenger utters crying, a circumstance in which the passenger utters a protection request word, and a circumstance in which the passenger is sleepy.

That is, when the passengers circumstances correspond to the predetermined circumstance information, the determined content being output under the control of the controller 130 may be modified.

Accordingly, the infant passenger may be provided with content that can induce interest or increase satisfaction even when the passenger cannot modify the content by his or her own choice. A detailed description for modifying the determined content will be described later.

The controller 130 may update the association between the content determined based on the emotion information obtained for the predetermined time after the determined content is output and the emotion information prior to the output of the determined content.

Particularly, the controller 130 may obtain the emotion information for the predetermined time after the determined content is output based on the image captured for the predetermined time after the determined content is output or the bio-signals measured for the predetermined after the determined content is output. The controller 130 may update the association between the emotion represented by the emotion information prior to the output of the determined content and the determined content by comparing the emotion information for the predetermined time after the determined content is output and the emotion information prior to the output of the determined content.

When a degree of positivity of the emotion information for the predetermined time after the output of the determined content is greater than the degree of positivity of the emotion information prior to the output of the determined content, the controller 130 may increase the association between the determined content and the emotion represented by the emotion information prior to the output of the determined content.

When a degree of positivity of the emotion information for the predetermined time after the output of the determined content is lower than the degree of positivity of the emotion information prior to the output of the determined content, the controller 130 may decrease the association between the determined content and the emotion represented by the emotion information prior to the output of the determined content.

The controller 130 may determine the other contents as the content corresponding to the emotion information when the association of the emotion represented by the emotion information of the determined content is lower than the association of the emotion represented by the emotion information of the other contents.

The controller 130 may include at least one memory storing a program for performing the above-described operations and operations, which will be described below, and at least one processor for executing the stored program. When there are a plurality of the memories and processors, they may be integrated into one chip or provided at physically separated positions.

The inputter 140 may receive an input from the driver of the vehicle 10 or the passenger seated on the passenger seat 12, which may be the guardian of the infant passenger.

Particularly, the inputter 140 may receive an input from the guardian of the infant passenger to control the content to be provided to the infant passenger. In other words, the guardian of the infant passenger may control the content to be provided through the inputter 140 so that the content can be provided to the infant passenger so that the infant passenger can concentrate on the content, and the passenger's guardian may concentrate on driving or other tasks.

In addition, the inputter 140 may receive the physical information by age, correlation information between the bio-signals and an emotion factor, correlation information between the facial expression and the emotion factor, an emotion model, the content reference information, and the circumstance reference information from a user of the vehicle 10. At this time, the user of the vehicle 10 may be the guardian or the driver of the vehicle 10.

The inputter 140 may be provided in a center fascia (not shown) installed in the center of a dashboard (not shown) and may be implemented with mechanical buttons, knobs, touch pad, touch screen, stick-type manipulation device, trackball, or the like. However, the position and implementation method of the inputter 140 are not limited to the above-described example, and may be included without limitation as long as the position and the implementation method of the user's input can be received.

The communicator 150 may communicate with an external server.

Particularly, the communicator 150 may receive the content, the physical information by age, the correlation information between the bio-signals and the emotion factor, the correlation information between the facial expression and the emotion factor, the emotion model, the content reference information, and the circumstance reference information from the external server.

Accordingly, the communicator 150 may perform communication with the external server using various methods. The communicator 150 may transmit and receive the information to/from the external server by using various methods, such as a radio frequency (RF), wireless fidelity (Wi-Fi), Bluetooth, Zigbee, Near field Communication (NFC), Ultra-Wide Band (UWB), etc. The method of performing communication with the external server is not limited to the above-described method, and any method may be used as long as it can communicate with the external server.

Also, in FIG. 2, the communicator 150 is illustrated as a single component transmitting and receiving a signal. However, the disclosure is not limited thereto, and a transmitter (not shown) for transmitting the signal and a receiver (not shown) for receiving the signal may be separately provided.

The storage 160 may store the content, the physical information by age, the correlation information between the bio-signals and the emotion factor, the correlation information between the facial expression and the emotion factor, the emotion model, the content reference information, the circumstance reference information, etc. and may store various information related to the vehicle 10.

The storage 160 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)) for storing various information, although not limited to these.

The user interface 170 may visually or audibly output the content determined or modified under the control of the controller 130. For this, the infant passenger may be provided with the determined or modified content.

Particularly, the user interface 170 may include the display 171 for visually outputting the determined content or the modified content.

The display 171 may be provided on a rear surface of the passenger seat 12 and may include a panel. The panel may be at least one of a cathode ray tube (CRT) panel, a liquid crystal display (LCD) panel, a light emitting diode (LED) panel, an organic light emitting diode (OLED) panel, a plasma display panel (PDP), and a field emission display (FED) panel. However, the position where the display 171 is installed is not limited to the above-described example, and may be included in any position that can provide the content to the infant passenger located in the rear seat 13. For example, the display 171 may be located on a rear surface of the driver's seat 11, or may be installed in a ceiling of the vehicle 10 or in a space between the driver's seat 11 and the passenger seat 12.

The user interface 170 may also include the speaker 172 for audibly outputting the determined content or the modified content. The speaker 172 may be provided inside the vehicle 100, for example, on the door of the vehicle 10. However, the position of the speaker 172 is not limited to this, and may be included without limitation as long as the infant passenger can listen to the content.

FIG. 3 is a view illustrating physical information by age according to an exemplary embodiment of the present disclosure.

Referring to FIG. 3, physical information 300 by age may include average physical information according to the infancy age in months. That is, the physical information 300 by age may include physical information, such as the average height information, the average heart rate, the average pulse rate, etc.

For example, the physical information 300 by age may include information representing that an average height of an infant at one month of age is 55 cm and information representing that the average heart rate of the infant at one month of age is 162 beats per minute.

The physical information 300 by age illustrated in FIG. 3 may include only the physical information corresponding to one month, six months, twelve months, and twenty-four months of age, but this is only an example, and the physical information 300 by age may include the average physical information of the infant corresponding to the infancy age in months.

In addition, FIG. 3 may exemplify only the average height and the average heart rate as the physical information. However, the physical information 300 by age may include unlimited infant physical information that may appear according to the infancy age in months. For example, the average physical information may include the average height, an average weight, the average heart rate, the average pulse rate, and an average number of breaths.

The controller 130 may determine the age of the passenger by comparing at least one of the passenger's image and the passengers bio-signals with the physical information 300 by age.

For example, the controller 130 may obtain the height information of the passenger by estimating the height of the passenger based on the image data of the passenger's image transmitted from the capturer 110 and determine a corresponding age by comparing the obtained height information with the height information by age of the physical information 300 by age.

Also, the controller 130 may determine the corresponding age by comparing the heart rate of the passenger's bio-signals received from the sensing device 120 with the heart rate information by age of the physical information 300 by age to determine the corresponding age.

The controller 130 may consider the passenger's age determined in the case of determining the content corresponding to the emotion information.

Particularly, the controller 130 may determine the age corresponding content group that includes at least one content corresponding to age, and determine the content having the highest association with the emotion represented by the emotion information among the at least one of content included in the determined age corresponding content group as the content corresponding to the emotion information.

At this time, the content reference information may include information about the age corresponding content group that classifies the content by age group. A detailed description of the content determination corresponding to the emotion information will be described later.

Figure 4:
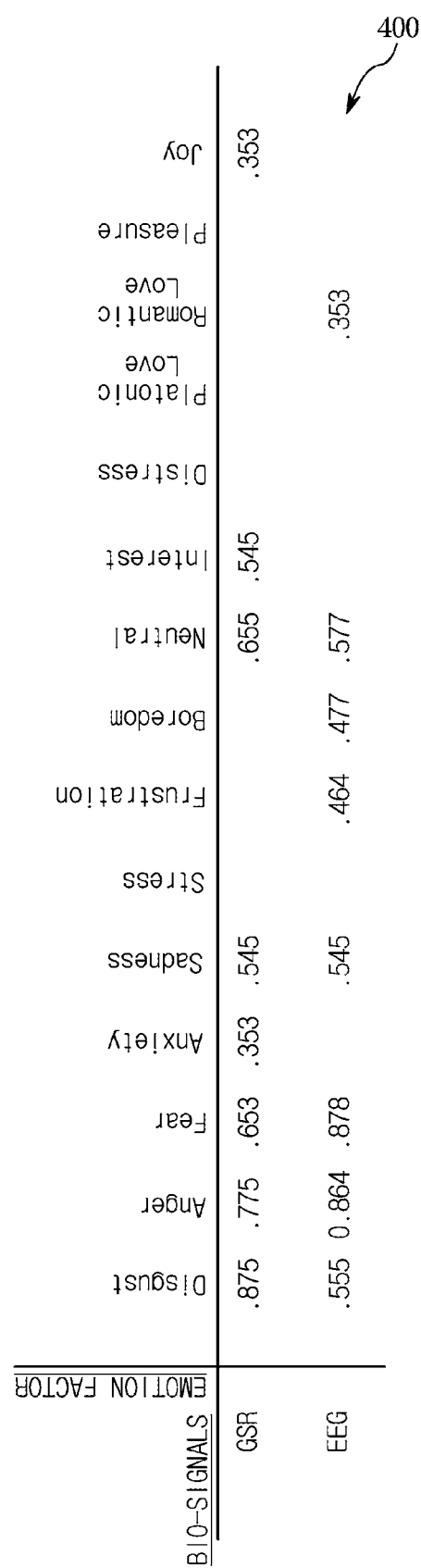
FIG. 4 is a view illustrating correlation information between bio-signals and emotion factors according to an exemplary embodiment of the present disclosure.

FIG. 4 is a view illustrating correlation information between bio-signals and emotion factors according to an exemplary embodiment of the present disclosure.

Referring to FIG. 4, the correlation information between GSR and EEG and emotion factors is illustrated.

In FIG. 4, a GSR signal has correlation values of 0.875 and 0.775 with emotion factors of Disgust and Anger, respectively, which indicates that the GSR signal has a high relevance with the emotion factors of Disgust and Anger. Therefore, the passenger's bio-signals collected by the GSR sensor may be the basis on which the passenger's emotion is determined as an anger emotion or a disgust emotion.

An emotion factor of Joy has a relatively low correlation value of 0.353 with the GSR signal, which indicates that the emotion factor of Joy is less relevant to the GSR signal.

An EEG signal has correlation values of 0.864 and 0.878 with emotion factors of Anger and Fear, respectively, which indicates that the EEG signal has a relatively higher relevance to the emotion factors of Anger and Fear than the other emotion factors. Therefore, the bio-signals collected by the EEG sensor may be the basis on which the passenger's emotion is determined as an anger emotion or a fear emotion.

In this way, the controller 130 may obtain the passenger's emotional information by using correlation information 400 between bio-signals and emotion factors. However, because the information illustrated in FIG. 4 is from experimental results, it may vary depending on the experimental environment.

Although correlation information between the GSR and the EEG and emotion factors is illustrated in FIG. 4, the correlation information 400 between the bio-signals and the emotion factors may include correlation information between different bio-signals and emotion factors depending on the kinds of bio-signals measured by sensors provided in the vehicle 10.

Figure 5:
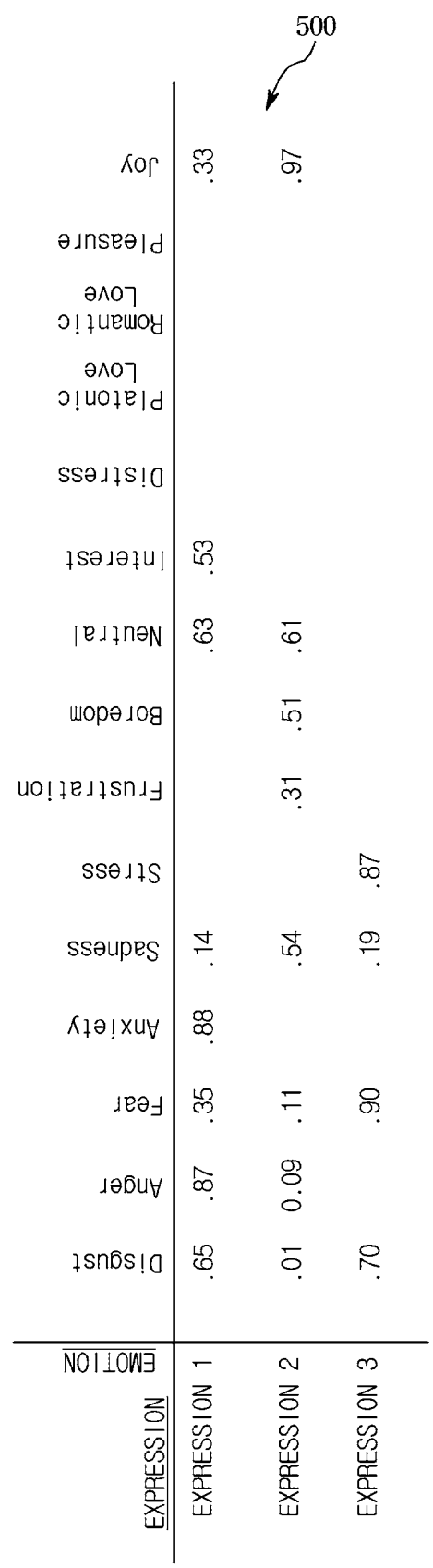
FIG. 5 is a view illustrating correlation information between facial expressions and emotion factors according to an exemplary embodiment of the present disclosure.

FIG. 5 is a view illustrating correlation information between facial expressions and emotion factors according to an exemplary embodiment of the present disclosure.

The controller 130 may recognize the passenger's facial expression appearing on the passenger's image captured by the capturer 110, and obtain the passenger's emotional information representing the passenger's emotion by applying a facial action coding system (FACS) to the passenger's facial expression.

More particularly, the controller 130 may extract a plurality of feature points from the face of the passenger, and extract a plurality of facial elements by using the extracted feature points. The plurality of facial elements may include eyebrows, eyes, nose, mouth, and the like. The controller 130 may combine patterns of the plurality of facial elements, and compare the combined patterns with correlation information 500 between facial expressions and emotion factors stored in the storage 160. The correlation information 500 between facial expressions and emotion factors may correspond to information representing relationships between facial expressions and emotion factors.

Referring to FIG. 5, the controller 130 may search a facial expression corresponding to the same pattern as or the most similar pattern to the combined pattern of the passenger in the correlation information 500 between facial expressions and emotion factors, and determine the searched facial expression as a facial expression of the passenger.

In addition, the controller 130 may obtain emotion information representing an emotion of the passenger by considering a correlation value for the determined facial expression of the passenger in the correlation information 500 between facial expressions and emotion factors.

For example, when the determined facial expression of the passenger corresponds to a facial expression 2 in the correlation information 500 between facial expressions and emotion factors, the controller 130 may obtain the emotion information representing that the passenger's emotion is a joy emotion having a highest correlation value for the facial expression 2.

In FIG. 5, the correlation information 500 between facial expressions and emotion factors includes a facial expression 1, the facial expression 2, and a facial expression 3, however, the correlation information 500 may further include another facial expression that may represent the passenger's emotion.

Figure 6:
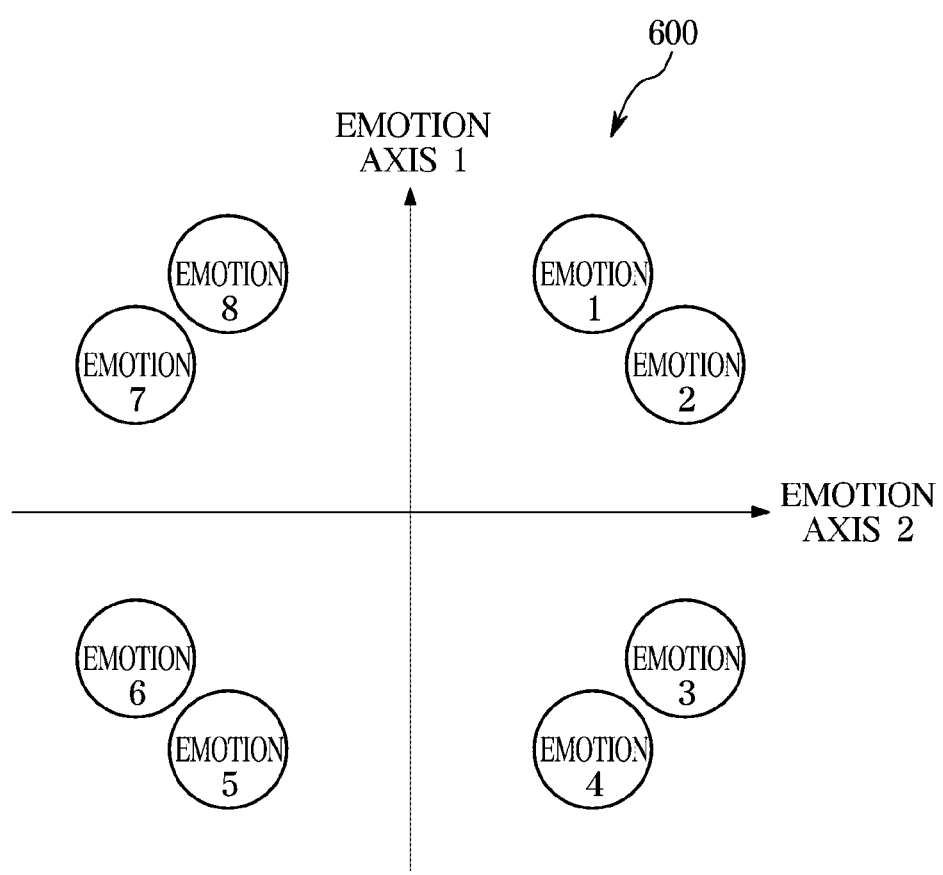
FIG. 6 is a view illustrating an emotion model according to an exemplary embodiment of the present disclosure.

FIG. 6 is a view illustrating an emotion model according to an exemplary embodiment of the present disclosure.

Referring to FIG. 6, an emotion model 600 may be a graph illustrating the passenger's emotions classified according to the passenger's bio-signals. The emotion model 600 may classify the passenger's emotions on the basis of predetermined emotion axes. The emotion axes may be determined based on emotions measured from the passenger's images or from the passenger's bio-signals. For example, emotional axis 1 may be degrees of positivity or negativity, which are measurable by voices or facial expressions of the passenger, and emotional axis 2 may be degrees of excitability or activity, which are measurable by the GSR or the EEG.

When the passenger's emotion has a high degree of positivity and a high degree of excitability, the emotion may be classified to emotion 1 or emotion 2. Conversely, when the passenger's emotion has minus (−) positivity, i.e., a high degree of negativity and a high degree of excitability, the emotion may be classified to emotion 3 or emotion 4.

The emotion model may be a Russell's emotion model. The Russell's emotional model may be expressed by a two-dimensional graph based on the x-axis and the y-axis, and may classify emotions to eight areas of joy (0 degrees), excitement (45 degrees), arousal (90 degrees), pain (135 degrees), unpleasantness (180 degrees), depression (225 degrees), sleepiness (270 degrees), and relaxation (315 degrees). In addition, the eight areas may comprise a total of 28 emotions that are classified into similar emotions belonging to the eight areas.

In this way, the controller 130 may obtain the passenger's emotional information by using the correlation information 400 between bio-signals and emotion factors, the correlation information 500 between facial expressions and emotion factors, and the emotion model 600.

FIG. 7 is a view illustrating content reference information according to an exemplary embodiment of the present disclosure.

The controller 130 may determine the content corresponding to the obtained emotion information.

Particularly, the controller 130 may determine the content corresponding to the obtained emotion information based on content reference information 700 stored in the storage 160.

Referring to FIG. 7, the content reference information 700 may include the association by emotion of each of the contents. That is, the content reference information 700 may include the association corresponding to the criterion of to what extent each of the contents can cause the positive emotional change for each of the plurality of emotions.

For example, the content reference information 700 is the association that corresponds the criterion of whether the passenger's emotion can cause the positive emotional change when the content is played in the situation where the emotion is a, and may include information representing that the content A is 0.84, the content B is 0.34, and the content C is 0.43.

That is, the content reference information 700 may include the value between 0 and 1 of the association that corresponds to the criterion of whether the positive emotion change can be caused in the corresponding emotion.

The controller 130 may determine the content corresponding to the emotion information having the highest association with the emotion based on the infant passengers emotion represented by the obtained emotion information.

That is, the controller 130 may determine the content corresponding to the emotion information, which is determined to cause the most positive emotional change in the current emotion, based on the current emotion of the passenger, and control the user interface 170 to output the determined content.

Accordingly, although the infant passenger cannot select the content with his or her own intention, the infant passenger may receive the content that can cause the most positive emotional change under the control of the controller 130.

Also, the controller 130 may consider the age of the infant passenger when determining the content corresponding to the emotion information.

The controller 130 may determine the age corresponding content group that includes at least one content corresponding to the age, and may determine the content having the highest association with the emotion represented by the emotion information among the at least one content included in the determined age corresponding content group as the content corresponding to the emotion information.

At this time, the content reference information 700 may include information about the age corresponding content group that classifies content by age group.

More particularly, the content reference information 700 may include information about at least one age corresponding content group by classifying the content by age group as illustrated in FIG. 7. For example, the content reference information 700 may include the age corresponding content group corresponding to one month of age, and the age corresponding content group corresponding to one month of age may include the content A, the content B, and the content C.

The age corresponding content group corresponding to each age may be determined in consideration of cognitive ability, learning ability or reaction ability according to the age of the infant. That is, the content included in the age corresponding content group corresponding to each age may be determined based on a design stage or the input of the user after the design stage and may be periodically updated and determined through the external server. At this time, the lower the age, the more easily the content included in the corresponding age corresponding content group may be composed, and education content that influences the improvement of the ability of the age may be included.

That is, the content reference information 700 may include the association by emotion of each of the contents, and include information about the age corresponding content group.

Accordingly, the controller 130 may determine the content corresponding to the passengers emotional information, which is the infant, and determine the content based on the age of the infant passenger.

In addition, the controller 130 may update the association between the content determined based on the emotion information obtained for the predetermined time after the determined content is output and the emotion information prior to the output of the determined content.

Particularly, the controller 130 may obtain the emotion information for the predetermined time after the determined content is output based on the image captured for the predetermined time after the determined content is output or the bio-signals measured for the predetermined after the determined content is output. The controller 130 may update the association between the emotion represented by the emotion information prior to the output of the determined content and the determined content by comparing the emotion information for the predetermined time after the determined content is output and the emotion information prior to the output of the determined content.

When a degree of positivity of the emotion information for the predetermined time after the output of the determined content is greater than the degree of positivity of the emotion information prior to the output of the determined content, the controller 130 may increase the association between the determined content and the emotion represented by the emotion information prior to the output of the determined content.

When a degree of positivity of the emotion information for the predetermined time after the output of the determined content is lower than the degree of positivity of the emotion information prior to the output of the determined content, the controller 130 may decrease the association between the determined content and the emotion represented by the emotion information prior to the output of the determined content.

The controller 130 may determine the other contents as the content corresponding to the emotion information when the association of the emotion represented by the emotion information of the determined content is lower than the association of the emotion represented by the emotion information of the other contents.

Figure 8:
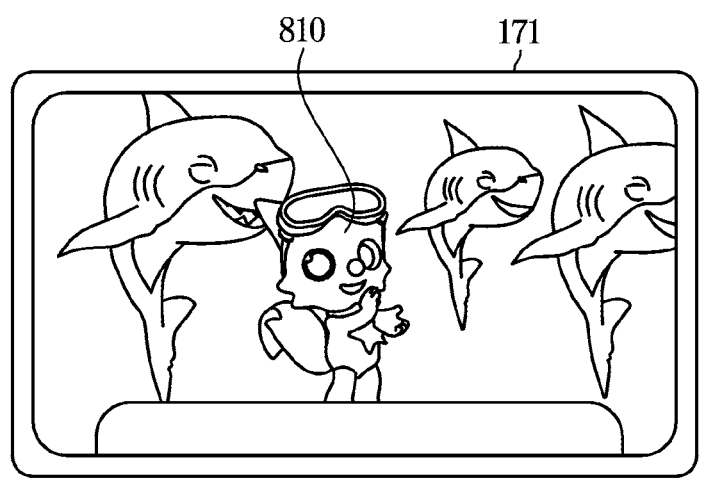
FIG. 8 is a view illustrating an output of determined content according to an exemplary embodiment of the present disclosure.

FIG. 8 is a view illustrating an output of determined content according to an exemplary embodiment of the present disclosure.

The controller 130 may determine the content corresponding to the passenger's emotional information, and control the user interface 170 to output the determined content.

Referring to FIG. 8, the determined content may be output through the display 171 of the user interface 170. The determined content may include at least one character 810.

In addition, the determined content may be output through the speaker 172 of the user interface 170. That is, the determined content may be output through the speaker 172 while outputting the image through the display 171, and at the same time, the music or the metabolism matched to the output image.

The at least one character 810 of the determined content may be provided in various forms. In particular, the at least one character 810 may be provided in various sizes and various styles.

Also, the at least one character 810 of the determined content may be provided in various colors, and may be expressed in various movements.

The determined content may include at least one playback interval, and a playback interval may be divided according to an allocation number of frames included in the playback interval. In addition, the shape, movement, color, etc. of the at least one character 810 output through the display 171 may be changed and output for each playback section, and the metabolism or music output through the speaker 172 may be output may be changed and output for each playback section.

The determined content may be provided in two dimensions (2D) or three dimensions (3D).

FIG. 9 is a view illustrating circumstance reference information according to an exemplary embodiment of the present disclosure.

The controller 130 may obtain the circumstance information representing the passenger's circumstances based on the passengers image or the passenger's bio-signals after the content corresponding to the emotion information is determined.

Particularly, the controller 130 may obtain the circumstance information based on the image captured for the predetermined time after the determined content is output or the bio-signals measured for the predetermined time after the determined content is output.

The circumstance information corresponds to the information representing the passenger's circumstances and the information representing the passenger's present situation.

For example, when the current circumstance of the passenger is in the state of discharging urine and feces, the circumstance information representing the urine and feces discharge state may be obtained.

At this time, the controller 130 may use the circumstance reference information stored in the storage 160.

Referring to FIG. 9, circumstance reference information 900 may include information about features represented by the passengers image and the bio-signals by circumstance. That is, the circumstance reference information 900 may include information about what features are occurring in the passenger's image and the bio-signals for a specific circumstance.

For example, the circumstance reference information 900 may include features such as grimace, tears, crying, and high heart rate in the situation of the passengers crying utterance as features of the passengers image and the bio-signals. For this, the controller 130 may determine that the current circumstance of the passenger is the crying utterance when the grimace, tears, crying, and high heart rate are captured or measured. In this case, the high heart rate may refer to a heart rate having a higher than average heart rate according to age.

Also, the circumstance reference information 900 may include features such as an angry expression, crying, and high heart rate in the situation where the degree of negativity of the passenger's emotion is equal to or greater than the threshold level, as features of the passenger's image and the bio-signals. For this, the controller 130 may determine that the degree of negativity of the passenger's emotion is equal to or greater than the threshold level.

As such, the circumstance reference information 900 may include features of the passenger's image and the bio-signals corresponding to each of the circumstances, such as the situation in which the degree of negativity of the passengers emotion is equal to or greater than the threshold level, the situation in which the passenger utters the crying, the situation in which the passenger utters the protection request word (e.g., mother, father, mamma, etc.) in which the passenger searches for the guardian, the situation of a drowsy state in which the passenger is sleeping, and the situation of the urine and feces discharge state in which the passenger discharges urine and feces. At this time, the threshold level may be set in the design stage as the criterion for emotional crying or guardianship as it changes to a negative emotional change, and may be changed through the inputter 140.

The circumstance reference information 900 of FIG. 9 is merely an example. However, the circumstance reference information 900 may include various circumstances that may occur to the passenger in the vehicle 10, and the passengers image and the bio-signals corresponding to each of the circumstances. The features of the passenger's image and the bio-signals illustrated in FIG. 9 are merely examples, and any behavior or bio-signals that may appear in each of the circumstances may be included without limitation.

In this way, the controller 130 may analyze the passengers image and the bio-signals based on the circumstance reference information 900, and obtain the circumstance information corresponding to the feature included in the circumstance reference information 900.

The controller 130 may modify the content determined based on the circumstance information.

Particularly, when the obtained circumstance information corresponds to predetermined circumstance information, the controller 130 may modify the determined content.

The predetermined circumstance information may correspond to the situation where the passenger's interest in the content is low and may be set when the vehicle 10 is designed, or may be set through the inputter 140 by the driver or the passenger corresponding to the guardian.

For example, the predetermined circumstance information may include the circumstance in which the degree of negativity of the passenger's emotion represented by the emotion information is equal to or greater than the threshold level, the circumstance in which the passenger utters the crying, the circumstance in which the passenger utters the protection request word, and the circumstance in which the passenger is sleepy.

That is, when the passengers circumstances correspond to the predetermined circumstance information, the determined content being output under the control of the controller 130 may be modified.

Accordingly, the infant passenger may be provided with content that can induce interest or increase satisfaction even when the passenger cannot modify the content by his or her own choice.

Figure 10:
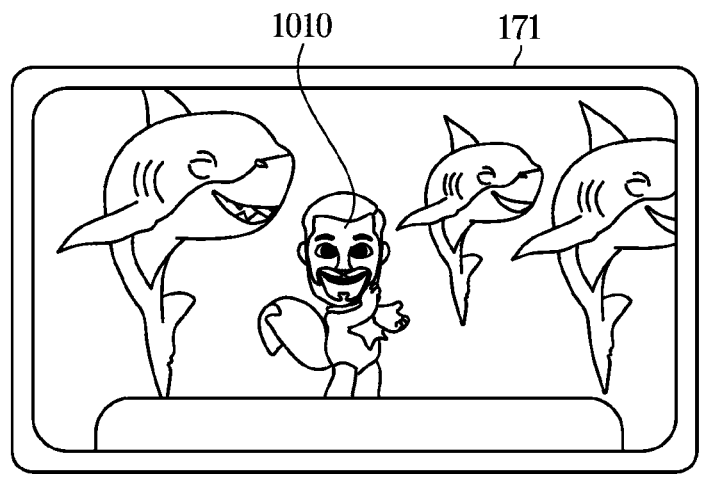
FIG. 10 is a view illustrating a modification of determined content according to an exemplary embodiment of the present disclosure.

FIG. 10 is a view illustrating a modification of determined content according to an embodiment.

The controller 130 may modify the content determined to correspond to the passengers emotional information based on the passenger's circumstance information, and control the user interface 170 to output the modified content.

Referring to FIG. 10, the modified content may be output through the display 171 of the user interface 170.

The controller 130 may modify a playback speed, playback music, the playback interval, an output size, and the like of the determined content. The controller 130 may modify, for example, the movement, shape, color, face, voice, etc., of the at least one character 810 included in the determined content.

As illustrated in FIG. 10, a modified character 1010 included in the modified content may be provided by modifying the face of the character 810 included in the determined content into the face of the guardian of the infant passenger.

At this time, the modified character 1010 may be provided by compositing a facial image of the guardian to a face position of the pre-modification character 810. The facial image of the guardian composed in the modified character 1010 may be modified in real time by reflecting the facial expression of the guardian captured through the camera (not shown) provided on the front end of the driver's seat 11 or the passenger seat 12.

That is, the controller 130 may modify the face of the modified character 1010 through a blend shape technique so that the facial expression of the guardian captured through the camera (not shown) provided on the front end of the driver's seat 11 or the passenger seat 12 may be reflected on the face of the modified character 1010.

To this end, the passenger's emotion of watching the modified contents reflecting the face of the familiar guardian may be induced in a positive direction, and the passenger's satisfaction and interest may be increased.

In addition, the controller 130 may modify the face of the character 810 into the face of the infant passenger receiving the content, such as modifying the face of the character 810 into the face of the guardian.

Furthermore, the controller 130 may provide the modified character 1010 by modifying the voice of the character 810 into the voice of the guardian.

At this time, the controller 130 may obtain the voice of the guardian through a microphone (not shown) provided at the front of the driver's seat 11 or the passenger seat 12, and generate the modified character 1010 into the voice of the guardian by reflecting the obtained voice.

To this end, an acoustic model for modeling and comparing signal characteristics of the voice and a language model for modeling a linguistic order relationship of words or syllables corresponding to recognized vocabulary may be used.

Particularly, the controller 130 may obtain nonverbal phonetic characteristics and linguistic characteristics of the voice of the guardian input through the microphone (not shown). The nonverbal phonetic characteristics may include, for example, a pitch, intensity, breathing, a speed, etc. of the passenger's voice. The linguistic characteristics may include, for example, a dialect, slang, an accent, etc. of the passenger's voice.

Accordingly, the controller 130 may generate the modified character 1010 that outputs the voice similar to the guardian's voice.

In addition, the controller 130 may modify the determined content through various methods.

Particularly, the controller 130 may determine the playback interval in which the degree of positivity of the passenger's emotion is less than the threshold level among at least one playback interval of the content determined based on the emotion information obtained in real time.

At this time, the threshold level may correspond to a minimum degree of positivity that the passenger is determined not to be interested in the content, and may be preset when the vehicle 10 is designed, or may be set through the input by the inputter 140.

The controller 130 may modify the determined content to increase the playback speed of the playback interval in which the degree of positivity of the passenger's emotion is less than the threshold level.

Accordingly, although the infant passenger cannot directly control the playback speed, the playback speed of the playback interval, which is not interesting under the control of the controller 130, may be increased.

In addition, the controller 130 may determine the playback interval in which the degree of positivity of the passengers emotion exceeds the threshold level among at least one playback interval of the content determined based on the emotion information obtained in real time.

At this time, the threshold level may correspond to the minimum degree of positivity that the passenger is determined to be interested in the content, and may be preset when the vehicle 10 is designed, or may be set through the input by the inputter 140.

The controller 130 may modify the determined content so that the playback music or a playback image in the playback interval in which the degree of positivity of the passengers emotion exceeds the threshold level is repeatedly played.

For this, although the infant passenger cannot play the content directly, the playback interval, which is interesting according to the control of the controller 130, may be repeatedly played.

At this time, the playback image may be output through the display 171, and the playback music may be output through the speaker 172. Also, the playback music may correspond to a song or a dialogue in which the infant passenger is determined to be interested.

In addition, the controller 130 may modify the content determined to increase the output size of the playback music in the playback interval where the degree of positivity of the passenger's emotion exceeds the threshold level. As a result, the playback music having the increased output size through the speaker 172 may be output.

In addition, the controller 130 may modify the determined content to increase an image size of the playback image at the playback interval where the degree of positivity of the passengers emotion exceeds the threshold level. As a result, the playback image having the increased image size may be output through the display 171.

In addition, the controller 130 may modify the content determined to reflect the movement, shape or color of the character in the playback interval at which the degree of positivity of the passenger's emotion exceeds the threshold level in the modified character 1010 of a current playback interval.

Thus, the infant passenger may be provided with the modified content reflecting the image, the music, the movement of the character, the shape of the character, and the color of the character at the playback interval in which his/her interest has been caused.

For this, the infant passenger may become interested and receive satisfaction based on the content provided. In addition, it is possible to avoid the situation in which the infant passenger searches for the guardian or cries by playing the content providing the interest and satisfaction, and the driver who is the guardian may lower the probability of occurrence of accidents by focusing more on driving.

Hereinafter, a control method of the vehicle 10 will be described. The vehicle 10 according to the above-described exemplary embodiment may be applied to the control method of the vehicle 10, as will be described later. Therefore, descriptions given above with reference to FIGS. 1 to 10 may be applied to the control method of the vehicle 10 in the same manner, unless otherwise noted.

Figure 11:
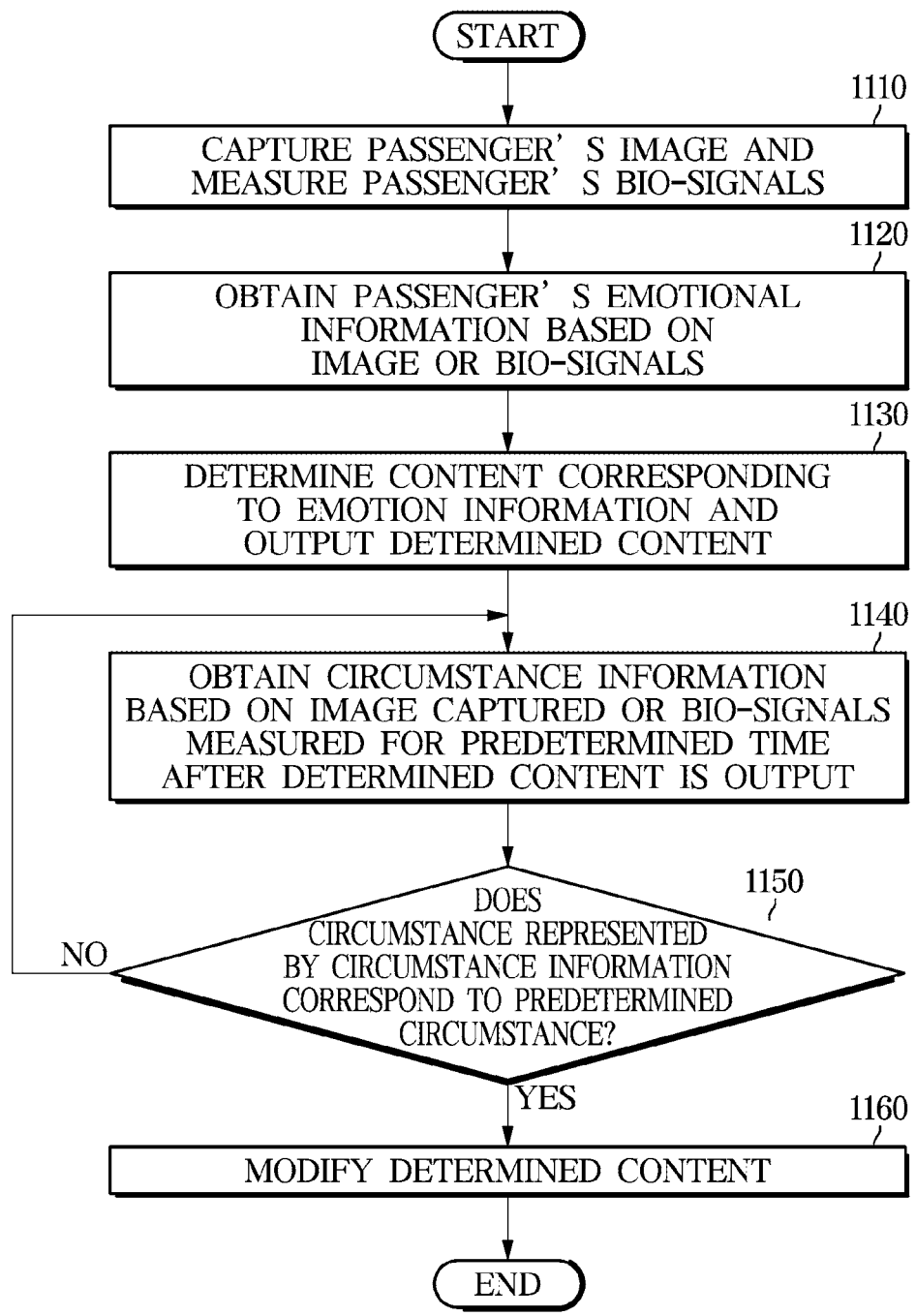
FIG. 11 is a flowchart related to a case of modifying determined content in a method of controlling a vehicle according to an exemplary embodiment of the present disclosure.

FIG. 11 is a flowchart related to a case of modifying determined content in a method of controlling a vehicle according to an exemplary embodiment of the present disclosure.

Referring to FIG. 11, the vehicle 10 may capture the passenger's image and measure the passenger's bio-signals (1110).

Particularly, the capturer 110 of the vehicle 10 may capture the passengers image, which is the infant seated on the rear seat 13, and may transmit the image data of the captured image to the controller 130.

In addition, the sensing device 120 of the vehicle 10 may obtain the passengers bio-signals, which is the infant seated on the rear seat 13, and may transmit the obtained bio-signals to the controller 130.

The controller 130 of the vehicle 10 may obtain the emotion information representing the passenger's emotion based on the passenger's image or the passenger's bio-signals (1120).

The vehicle 10 may determine the content corresponding to the obtained emotion information and output the determined content (1130).

The controller 130 may determine the content corresponding to the obtained emotion information and control the user interface 170 to output the determined content.

The controller 130 may determine the content corresponding to the obtained emotion information based on content reference information 700 stored in the storage 160.

The content reference information 700 may include the association by emotion of each of the contents. That is, the content reference information 700 may include the association corresponding to the criterion of to what extent each of the contents can cause the positive emotional change for each of the plurality of emotions.

The controller 130 may determine the content corresponding to the emotion information having the highest association with the emotion based on the infant passengers emotion represented by the obtained emotion information.

Accordingly, although the infant passenger cannot select the content with his or her own intention, the infant passenger may receive the content that can cause the most positive emotional change under the control of the controller 130.

The controller 130 may consider the age of the infant passenger when determining the content corresponding to the emotion information.

Particularly, the controller 130 may determine the age of the passenger based on the passengers image or the passenger's bio-signals.

At this time, the controller 130 may use the physical information 300 by age stored in the storage 160.

The physical information 300 by age may include average physical information according to the infancy age in months. For example, the physical information 300 by age may include physical information such as average height information, average heart rate, and average pulse rate per month.

Accordingly, the controller 130 may determine the age of the infant passenger by comparing at least one of the passengers image and the passenger's bio-signals with the physical information by age.

The controller 130 may determine the age corresponding content group that includes at least one content corresponding to the age, and may determine the content having the highest association with the emotion represented by the emotion information among the at least one content included in the determined age corresponding content group as the content corresponding to the emotion information.

At this time, the content reference information 700 may include information about the age corresponding content group that classifies content by age group.

The vehicle 10 may obtain the circumstance information based on the image captured for the predetermined time after the determined content is output or the bio-signals measured for the predetermined time after the determined content is output (1140).

The circumstance information corresponds to the information representing the passenger's circumstances and the information representing the passenger's present situation. For example, when the current circumstance of the passenger is in the state of discharging urine and feces, the circumstance information representing the urine and feces discharge state may be obtained.

At this time, the controller 130 may use the circumstance reference information stored in the storage 160.

The circumstance reference information 900 may include information about features represented by the passenger's image and the bio-signals by circumstance. That is, the circumstance reference information 900 may include information about what features are occurring in the passengers image and the bio-signals for the specific circumstance.

In this way, the controller 130 may analyze the passengers image and the bio-signals based on the circumstance reference information 900, and obtain the circumstance information corresponding to the feature included in the circumstance reference information 900.

When a circumstance represented by the circumstance information corresponds to a predetermined circumstance (YES in 1150), the vehicle 10 may modify the determined content (1160).

The predetermined circumstance information may correspond to the situation where the passenger's interest in the content is low and may be set when the vehicle 10 is designed, or may be set through the inputter 140 by the driver or the passenger corresponding to the guardian.

For example, the predetermined circumstance information may include the circumstance in which the degree of negativity of the passenger's emotion represented by the emotion information is equal to or greater than the threshold level, the circumstance in which the passenger utters the crying, the circumstance in which the passenger utters the protection request word, and the circumstance in which the passenger is sleepy.

That is, when the passengers circumstances correspond to the predetermined circumstance information, the determined content being output under the control of the controller 130 may be modified.

Accordingly, the infant passenger may be provided with content that can induce interest or increase satisfaction even when the passenger cannot modify the content by his or her own choice.

Figure 12:
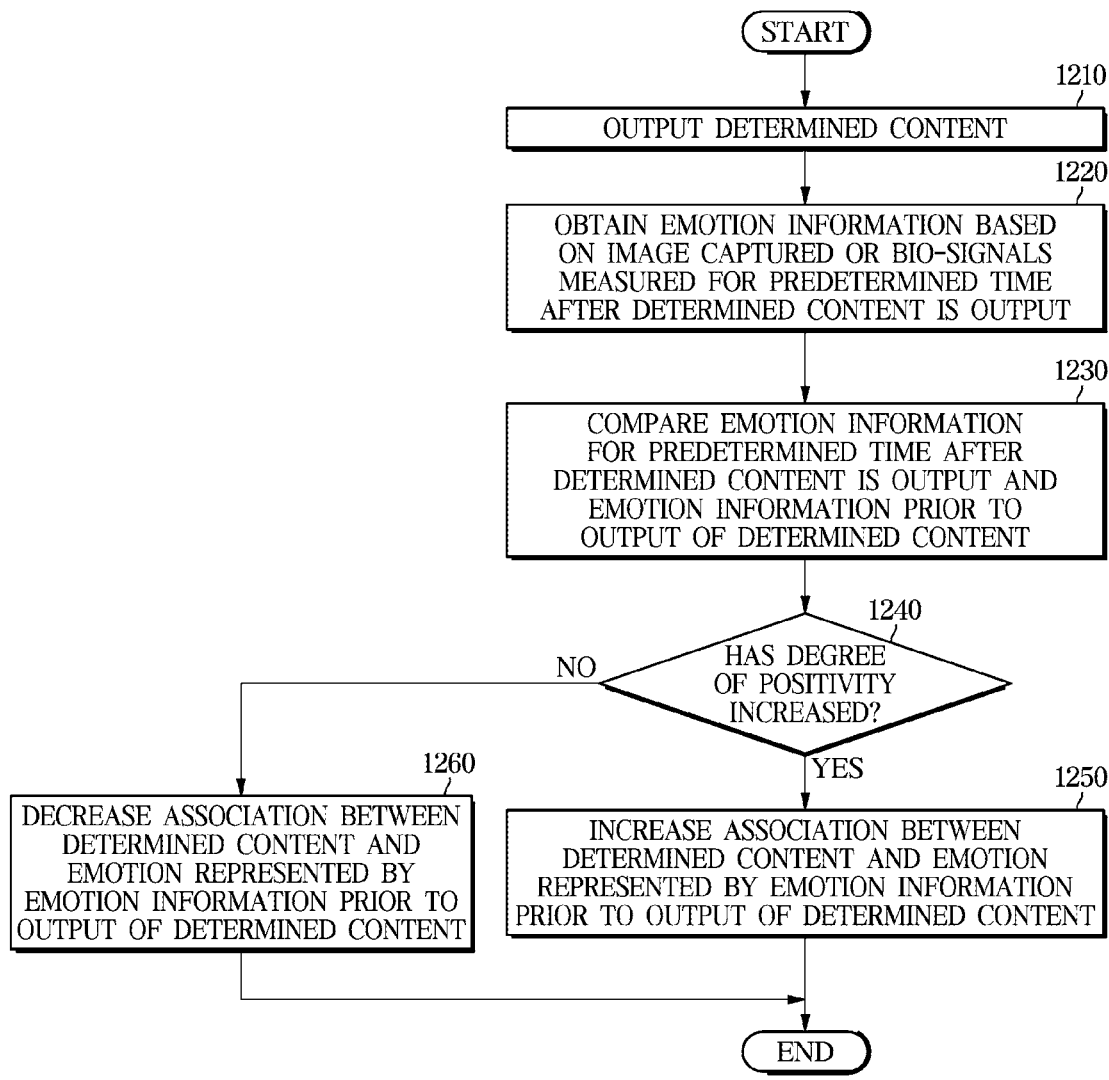
FIG. 12 is a flowchart related to a case of updating content reference information in a method of controlling a vehicle according to an exemplary embodiment of the present disclosure.

FIG. 12 is a flowchart related to a case of updating content reference information in a method of controlling a vehicle according to an exemplary embodiment of the present disclosure.

Referring to FIG. 12, the vehicle 10 may output the determined content (1210).

Particularly, the controller 130 may obtain the emotion information representing the passenger's emotion based on the captured passenger's image and the measured passengers bio-signals, determine the content corresponding to the obtained emotion information, and control the user interface 170 to output the determined content.

The vehicle 10 may update the association between the content determined based on the emotion information obtained for the predetermined time after the determined content is output and the emotion information prior to the output of the determined content.

Particularly, the vehicle 10 may obtain the emotion information for the predetermined time after the determined content is output based on the image captured for the predetermined time after the determined content is output or the bio-signals measured for the predetermined after the determined content is output (1220).

The vehicle 10 may compare the emotion information for the predetermined time after the determined content is output and the emotion information prior to the output of the determined content (1230). For this, the vehicle 10 may update the association between the emotion represented by the emotion information prior to the output of the determined content and the determined content.

Particularly, when the degree of positivity of the emotion information for the predetermined time after the output of the determined content is greater than the degree of positivity of the emotion information prior to the output of the determined content (YES in 1240), the vehicle 10 may increase the association between the determined content and the emotion represented by the emotion information prior to the output of the determined content (1250).

Further, when the degree of positivity of the emotion information for the predetermined time after the output of the determined content is lower than the degree of positivity of the emotion information prior to the output of the determined content (NO in 1240), the vehicle 10 may decrease the association between the determined content and the emotion represented by the emotion information prior to the output of the determined content (1260).

The vehicle 10 may determine the other contents as the content corresponding to the emotion information when the association of the emotion represented by the emotion information of the determined content is lower than the association of the emotion represented by the emotion information of the other contents.

As is apparent from the above description, the disclosure may determine the passenger's emotion and circumstances, and adaptively provide content to the passenger based on the determined emotion and circumstances to induce the passenger's interest and satisfaction, thereby allowing the passenger to concentrate on the content.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed exemplary embodiments. The recording medium may be implemented as a non-transitory computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
    a user interface including a display and a speaker;
    a camera configured to capture an image of a passenger;
    a sensing device configured to measure bio-signals of the passenger; and
    a processor configured to:
        obtain emotion information representing emotion of the passenger based on the image;
        determine a content corresponding to the emotion information;
        control the user interface to output the determined content;
        obtain circumstance information representing circumstances of the passenger based on the image after the determined content is output;
        modify the determined content based on the circumstance information; and
        control the user interface to output the modified content,
    wherein the processor is further configured to:
        obtain the emotion information based on the image or the bio-signals of the passenger; and
        obtain the circumstance information based on the image or the bio-signals of the passenger after the determined content is output, and
    wherein the processor is further configured to compare at least one of the image with physical information by age to determine an age of the passenger, wherein the physical information comprises heart rate information.

2. The vehicle according to claim 1, wherein the processor is further configured to:
    obtain the circumstance information based on the captured image or the measured bio-signals for a predetermined time after the determined content is output; and
    modify the determined content when a circumstance represented by the circumstance information corresponds to a predetermined circumstance.

3. The vehicle according to claim 2, wherein the predetermined circumstance comprises at least one of a circumstance in which a degree of negativity of the emotion of the passenger represented by the emotion information is equal to or greater than a threshold level, a circumstance in which the passenger utters crying, a circumstance in which the passenger utters a protection request word, or a circumstance in which the passenger is sleepy.

4. The vehicle according to claim 2, wherein the processor is further configured to modify at least one of a playback speed, playback music, a playback interval, an output size, a movement of a character, a shape of the character, a color of the character, a face of the character, or a voice of the character of the determined content.

5. The vehicle according to claim 4, wherein the processor is further configured to:
    determine the playback interval, in which a degree of positivity of the emotion of the passenger is less than a threshold level among at least one playback interval of the determined content, based on the emotion information; and
    modify the determined content to increase the playback speed of the playback interval.

6. The vehicle according to claim 4, wherein the processor is further configured to determine the playback interval, in which a degree of positivity of the emotion of the passenger is less than a threshold level among at least one playback interval of the determined content, based on the emotion information.

7. The vehicle according to claim 6, wherein the processor is further configured to modify the determined content to play so that the playback music or the playback image in the playback interval is repeatedly played.

8. The vehicle according to claim 6, wherein the processor is further configured to:
    modify the determined content to increase the output size of the playback music in the playback interval; or
    modify the determined content to increase an image size of the playback image in the playback interval.

9. The vehicle according to claim 6, wherein the processor is further configured to modify the determined content so that the movement of the character, the shape of the character, or the color of the character in the playback interval is reflected in the character of a current playback interval.

10. The vehicle according to claim 4, wherein the processor is further configured to modify the determined content so that the face of the character is modified into a face of the passenger or a face of a guardian, or the voice of the character is modified into a voice of the passenger or a voice of the guardian.

11. The vehicle according to claim 1, wherein the processor is further configured to:
    determine an age corresponding content group that includes at least one content corresponding to the age; and
    determine the content having a highest association with the emotion represented by the emotion information among the at least one content included in the age corresponding content group as the content corresponding to the emotion information.

12. The vehicle according to claim 11, wherein the processor is further configured to:
    obtain the emotion information for a predetermined time after the determined content is output based on the image captured or the bio-signals measured for the predetermined time after the determined content is output;
    compare the emotion information for the predetermined time after the determined content is output and the emotion information prior to an output of the determined content; and
    update an association between the emotion represented by the emotion information and the determined content.

13. The vehicle according to claim 12, wherein the processor is further configured to:
    increase, when a degree of positivity of the emotion information for the predetermined time after the output of the determined content is greater than the degree of positivity of the emotion information prior to the output of the determined content, the association between the determined content and the emotion represented by the emotion information;
    decrease, when a degree of positivity of the emotion information for the predetermined time after the output of the determined content is lower than the degree of positivity of the emotion information prior to the output of the determined content, the association between the determined content and the emotion represented by the emotion information; and
    determine, when the association of the emotion represented by the emotion information of the determined content is lower than the association of the emotion represented by the emotion information of the other contents including the age corresponding content group, the other contents as the content corresponding to the emotion information.

14. A method of controlling a vehicle that includes a user interface including a display and a speaker, the method comprising:
    capturing, by a camera, an image of the passenger;
    measuring, by a sensing device, bio-signals of the passenger;
    obtaining, by a processor, emotion information representing emotion of the passenger based on the image;
    determining, by the processor, content corresponding to the emotion information;
    controlling, by the processor, the user interface to output the determined content;
    obtaining, by the processor, circumstance information representing circumstances of the passenger based on the image after the determined content is output;
    modifying, by the processor, the determined content based on the circumstance information;
    controlling, by the processor, the user interface to output the modified content;
    obtaining, by the processor, the emotion information based on the image or the bio-signals;
    obtaining, by the processor, the circumstance information based on the image or the bio-signals after the determined content is output; and
    comparing, by the processor, at least one of the image with physical information by age to determine an age of the passenger, wherein the physical information comprises heart rate information.

15. The method according to claim 14, wherein the modifying of the determined content comprises:
    obtaining the circumstance information based on the captured image or the measured bio-signals for a predetermined time after the determined content is output; and
    modifying the determined content when a circumstance represented by the circumstance information corresponds to a predetermined circumstance.

16. The method according to claim 15, wherein the predetermined circumstance comprises at least one of a circumstance in which a degree of negativity of the emotion of the passenger represented by the emotion information is equal to or greater than a threshold level, a circumstance in which the passenger utters crying, a circumstance in which the passenger utters a protection request word, or a circumstance in which the passenger is sleepy.

17. The method according to claim 15, wherein the modifying of the determined content comprises:
    modifying at least one of a playback speed, playback music, a playback interval, an output size, a movement of a character, a shape of the character, a color of the character, a face of the character, or a voice of the character of the determined content.

18. The method according to claim 17, wherein the modifying of the determined content comprises:
    determining the playback interval, in which a degree of positivity of the emotion of the passenger is less than a threshold level among at least one playback interval of the determined content, based on the emotion information; and
    modifying the determined content to increase the playback speed of the playback interval.

19. The method according to claim 17, wherein the modifying of the determined content comprises:
    determining the playback interval in which a degree of positivity of the emotion of the passenger is less than a threshold level among at least one playback interval of the determined content, based on the emotion information.

20. The method according to claim 19, wherein the modifying of the determined content comprises:
    modifying the determined content to play so that the playback music or the playback image in the first playback interval is repeatedly played.

21. The method according to claim 19, wherein the modifying of the determined content comprises:
    modifying the determined content to increase the output size of the playback music in the playback interval; or
    modifying the determined content to increase an image size of the playback image in the playback interval.

22. The method according to claim 19, wherein the modifying of the determined content comprises:
    modifying the determined content so that the movement of the character, the shape of the character, or the color of the character in the first playback interval is reflected in the character of a current playback interval.

23. The method according to claim 17, wherein the modifying of the determined content comprises:
    modifying the determined content so that the face of the character is modified into a face of the passenger or a face of a guardian, or the voice of the character is modified into a voice of the passenger or a voice of the guardian.

24. The method according to claim 14, wherein the determining of the content corresponding to the emotion information comprises:

determining an age corresponding content group that includes at least one content corresponding to the age; and determining the content having a highest association with the emotion represented by the emotion information among the at least one content included in the age corresponding content group as the content corresponding to the emotion information.

25. The method according to claim 24, further comprising:

obtaining, by the processor, the emotion information for the predetermined time after the determined content is output based on the image captured or the bio-signals measured for the predetermined time after the determined content is output;

comparing, by the processor, the emotion information for the predetermined time after the determined content is output and the emotion information prior to the output of the determined content; and updating, by the processor, the association between the emotion represented by the emotion information and the determined content.

26. The method according to claim 25, wherein the updating of the association comprises:

increasing, when a degree of positivity of the emotion information for the predetermined time after the output of the determined content is greater than the degree of positivity of the emotion information prior to the output of the determined content, an association between the determined content and the emotion represented by the emotion information;

decreasing, when a degree of positivity of the emotion information for the predetermined time after the output of the determined content is lower than the degree of positivity of the emotion information prior to the output of the determined content, the association between the determined content and the emotion represented by the emotion information; and determining, by the processor, when the association of the emotion represented by the emotion information of the determined content is lower than the association of the emotion represented by the emotion information of the other contents including the age corresponding content group, the other contents as the content corresponding to the emotion information.

* * * * *